(12) United States Patent
Naveh et al.

(10) Patent No.: US 10,277,692 B2
(45) Date of Patent: *Apr. 30, 2019

(54) METHOD AND APPARATUS FOR IDENTIFYING COMMON INTEREST BETWEEN SOCIAL NETWORK USERS

(71) Applicant: Facebook, Inc., Menlo Park, CA (US)

(72) Inventors: Barak Reuven Naveh, Palo Alto, CA (US); Georgios Karnas, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/936,561

(22) Filed: Nov. 9, 2015

(65) Prior Publication Data

US 2016/0063127 A1 Mar. 3, 2016

Related U.S. Application Data

(63) Continuation of application No. 13/646,618, filed on Oct. 5, 2012, now Pat. No. 9,225,788.

(51) Int. Cl.
*H04L 29/08* (2006.01)
*H04L 12/58* (2006.01)
(Continued)

(52) U.S. Cl.
CPC .............. *H04L 67/22* (2013.01); *G06F 17/30* (2013.01); *G06F 17/30637* (2013.01);
(Continued)

(58) Field of Classification Search
CPC ....... H04L 67/22; H04L 67/306; H04L 67/30; G06F 17/30867; G06F 17/30634; G06F 17/30637; G06F 17/30646; G06F 17/30654; G06F 17/30663; G06F 17/30672; G06F 17/30693
See application file for complete search history.

(56) References Cited

U.S. PATENT DOCUMENTS 8,375,310 B2 2/2013 Hamilton, II et al.
8,478,716 B2 7/2013 Flinn et al.
(Continued)

OTHER PUBLICATIONS

U.S. Appl. No. 13/646,618 by Naveh, B., et al., filed Oct. 5, 2012.
(Continued)

*Primary Examiner* — Ramy M Osman
(74) *Attorney, Agent, or Firm* — Keller Jolley Preece

(57) ABSTRACT

Techniques for identifying mutual interests between users of a social networking system are disclosed herein. In one embodiment, a method includes steps of identifying, in a social networking system, a content object that has been interacted by a first user of the social networking system; associating, in the social networking system, a keyword with the first user, the keyword having been previously associated with the content object; and determining, in the social networking system, a mutual interest for the first user and a second user of the social networking system by identifying a match between the keyword associated with the first user with a keyword associated with the second user.

20 Claims, 9 Drawing Sheets

(51) Int. Cl.
*G06F 17/30* (2006.01)
*G06Q 50/00* (2012.01)

(52) U.S. Cl.
CPC .. *G06F 17/30646* (2013.01); *G06F 17/30693* (2013.01); *G06F 17/30699* (2013.01); *G06F 17/30867* (2013.01); *G06Q 50/01* (2013.01); *H04L 51/32* (2013.01); *H04L 67/306* (2013.01); *G06F 17/30528* (2013.01); *H04L 67/18* (2013.01)

(56) References Cited

U.S. PATENT DOCUMENTS

| | | | |
|---|---|---|---|
| 8,595,297 B2 | 11/2013 | Marcucci et al. | |
| 8,612,475 B2 | 12/2013 | Graham et al. | |
| 8,756,187 B2 | 6/2014 | Nathan et al. | |
| 9,225,788 B2* | 12/2015 | Naveh | H04L 67/22 |
| 9,432,419 B2* | 8/2016 | Borenstein | H04L 51/32 |
| 2007/0016585 A1* | 1/2007 | Nickell | G06F 17/30864 |
| 2008/0033930 A1* | 2/2008 | Warren | G06Q 10/10 |
| 2008/0168117 A1* | 7/2008 | Coates | G06F 17/30867 |
| | | | 709/201 |
| 2009/0176509 A1 | 7/2009 | Davis et al. | |
| 2009/0249248 A1* | 10/2009 | Burckart | G06F 17/30864 |
| | | | 715/810 |
| 2010/0037141 A1* | 2/2010 | Carter | G06Q 10/10 |
| | | | 715/733 |
| 2011/0106718 A1 | 5/2011 | Roberts et al. | |
| 2011/0119293 A1* | 5/2011 | Taylor | G06F 21/10 |
| | | | 707/769 |
| 2011/0196923 A1 | 8/2011 | Marcucci et al. | |
| 2012/0005224 A1* | 1/2012 | Ahrens | H04L 51/32 |
| | | | 707/769 |
| 2012/0159635 A1 | 6/2012 | He et al. | |
| 2012/0166532 A1 | 6/2012 | Juan et al. | |
| 2012/0166533 A1 | 6/2012 | Rubinstein et al. | |
| 2012/0259842 A1 | 10/2012 | Oman et al. | |
| 2012/0284105 A1 | 11/2012 | Li et al. | |
| 2013/0013595 A1* | 1/2013 | Tseng | G06F 17/3087 |
| | | | 707/723 |
| 2013/0031100 A1 | 1/2013 | Graham et al. | |
| 2013/0036114 A1 | 2/2013 | Wong et al. | |
| 2013/0103686 A1* | 4/2013 | Sisneros | G06Q 50/01 |
| | | | 707/736 |
| 2013/0117329 A1 | 5/2013 | Bank et al. | |
| 2013/0246520 A1 | 9/2013 | Belvin et al. | |
| 2013/0311505 A1* | 11/2013 | McCallum | G06F 17/30616 |
| | | | 707/767 |
| 2014/0052540 A1 | 2/2014 | Rajaram et al. | |
| 2014/0101243 A1* | 4/2014 | Naveh | H04L 67/22 |
| | | | 709/204 |
| 2014/0244335 A1 | 8/2014 | Baldwin et al. | |
| 2014/0279994 A1* | 9/2014 | Gulli | G06F 17/30646 |
| | | | 707/706 |
| 2015/0012527 A1* | 1/2015 | Hewitt | G06F 17/30643 |
| | | | 707/722 |
| 2016/0063127 A1* | 3/2016 | Naveh | H04L 67/306 |
| | | | 707/722 |
| 2016/0314193 A1* | 10/2016 | Enoki | G06F 17/30646 |
| 2016/0378790 A1* | 12/2016 | Besehanic | G06F 17/30817 |
| | | | 707/706 |
| 2017/0154040 A1* | 6/2017 | Munemann | G06F 17/30867 |

OTHER PUBLICATIONS

Non-Final Office Action dated Aug. 19, 2014, for U.S. Appl. No. 13/646,618 of Naveh, B.R. et al. filed Oct. 5, 2012.
Non-Final Office Action dated May 6, 2015, for U.S. Appl. No. 13/646,618 of Naveh, B.R. et al. filed Oct. 5, 2012.
Notice of Allowance dated Nov. 3, 2015, for U.S. Appl. No. 13/646,618 of Naveh, B.R. et al. filed Oct. 5, 2012.

* cited by examiner

METHOD AND APPARATUS FOR IDENTIFYING COMMON INTEREST BETWEEN SOCIAL NETWORK USERS

CLAIM OF PRIORITY

This application is a Continuation of U.S. patent application Ser. No. 13/646,618 entitled "METHOD AND APPARATUS FOR IDENTIFYING COMMON INTEREST BETWEEN SOCIAL NETWORK USERS," filed Oct. 5, 2012, which is expressly incorporated herein by reference.

FIELD OF THE INVENTION

This invention relates generally to social networking systems, and in particular to a social networking system capable of identifying common interests between users of the social networking system.

BACKGROUND

Social networking systems are online services, computers, platforms, or websites, or combinations thereof, which facilitate the building of social networks or social relations among people. For example, users of a social networking system can share interests, arrange activities, or even make real-life connections. An Internet-based social networking system can use representations (profiles) of the users, social links of the users, and various services to help the user to interact with and extend their social networks.

Using social networking systems, a person can grow his/her social network by discovering people who have similar interests or experiences. However, it can take a substantial amount of time and effort to identify such people. Finding unfamiliar people who share one's interests is difficult. It is not uncommon that two strangers spend a long and awkward conversation and interaction (online or face-to-face) to discover their common interests or experience.

Even with current social networking systems designed to aid the process of connecting people, the process is still primarily cumbersome and static. For example, a typical social networking website requires users to provide biographical information by filling out profile forms. A user can disclose his or her interests by providing personal information such as professional interests, career information, interests in media, political opinions and religious beliefs. A matching algorithm then uses the profile and interest data provided by the user to match other users who are determined to be like-minded by the algorithm. However, the success rate of the matching algorithm depends on the quality of the data entered by the users. For various reasons, a user may provide incomplete, inaccurate, or even misleading data that does not well represent the actual interests of the user. Further, users rarely bother to update their profile and interest data, while their interests can constantly change over time. The profile and interest data only reflects a static and potentially inaccurate image of a user at the time when the user provides the profile and interest data. Therefore, a matching algorithm such as discussed above can have a low success rate.

SUMMARY

The technology introduced here provides the benefits of automatically identifying mutual interests between social networking system users, without the need of users providing profile information describing themselves. In particular, the technology introduced here includes a method for identifying mutual interests between users of a social networking system based on keyword phrases. A keyword phrase can include one or more words, a phrase, or a sentence; and can even include symbols. The keyword phrases are generated from reverse keyword searches based on content objects in which users show interest. Content objects can include, for example, webpages, posts, messages, pictures, videos, audios, texts, any other type of media content and logical containers of the media content. Unlike conventional keyword searches (also referred to as forward keyword searches), a reverse keyword search receives a content object as input and identifies keyword phrases that are related to the content object as output. These keywords phrases are ranked by a forward keyword search as highly likely match to the content object.

In accordance with the techniques introduced here, therefore, a method for identifying mutual interests between social networking system users is provided. The method in one embodiment includes identifying, by a social networking system, a content object with which a first user of the social networking system has interacted. The social networking associates a keyword phrase with the first user. The keyword phrase is associated with the content object. The social networking system further determines a mutual interest for the first user and a second user of the social networking system by identifying a match between the keyword phrase associated with the first user with a keyword phrase associated with the second user.

By monitoring user activities, the social networking system automatically collects keyword phrases that are related to users' interests, based on the users' interactions with content objects. The monitoring or tracking is subject to the user's privacy settings. The social networking system then identifies mutual interests among the users by comparing the keyword phrases associated with the users. There is typically no need of user interventions during the process. The system continues updating the keyword phrases based on the monitored user activities. Thus, the interests of the users are presented by the keyword phrases automatically generated by the above process truthfully and dynamically.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this description do not necessarily all refer to the same embodiment, nor are they necessarily mutually exclusive.

The social networking system disclosed herein can recognize users' interests in a dynamic and continuous manner. The social networking system monitors the user activities to identify content objects in which the users show interests via interactions. The monitoring is subject to the user's privacy settings. Through reverse keyword searches based on the identified content objects, the system generates keyword phrases to truthfully represent the users' interests. Therefore, the social networking system can make targeted matches between the users by comparing the updated keyword phrases accurately representing the users' current interests. The social networking system can include one or more computers and/or other processing devices.

Figure 1:
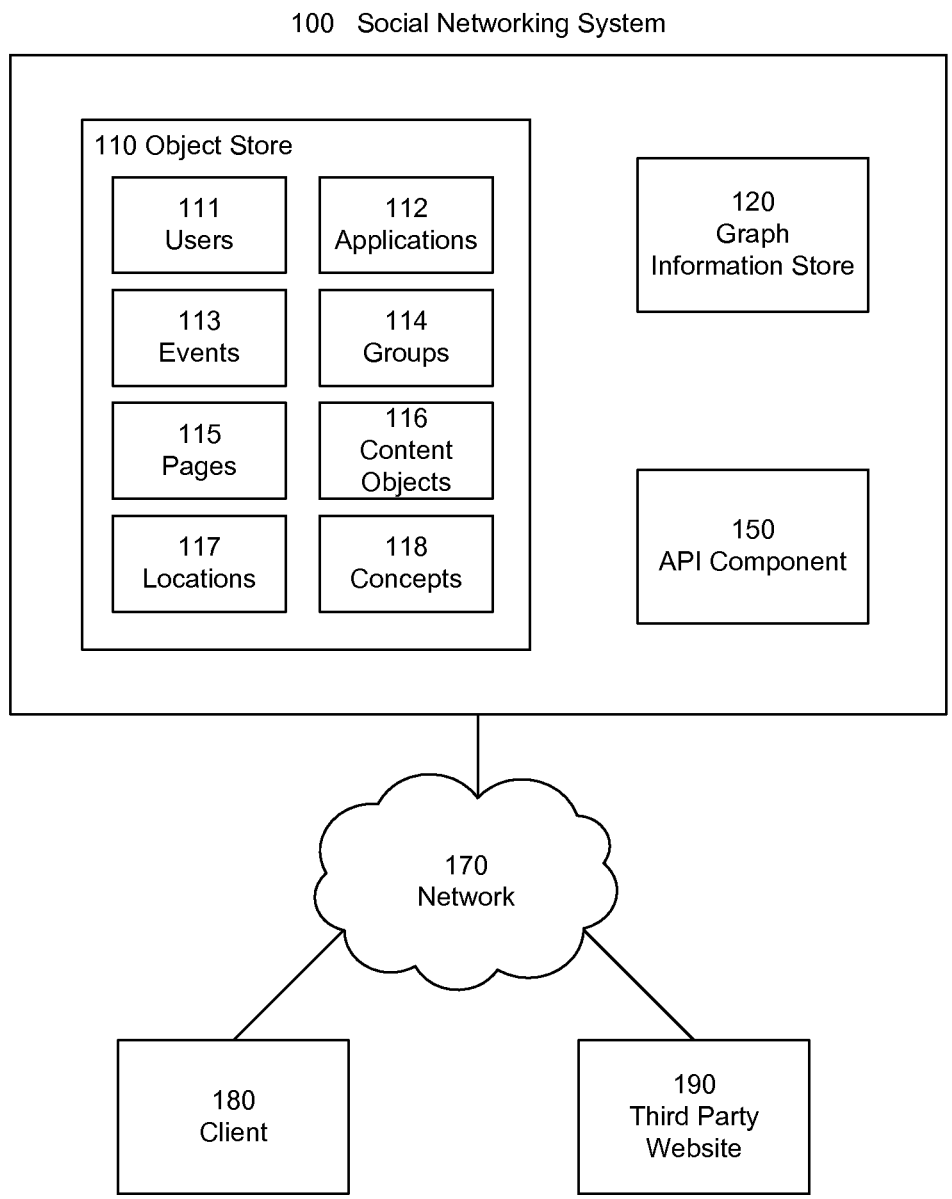
FIG. 1 is a high-level block diagram of a computing environment for a social networking system.

FIG. 1 is a high-level block diagram of a computing environment for such a social networking system 100. One or more client devices 180 (also referred to as "clients") and one or more third party websites 190 are connected with the social networking system 100 by a network 170. The network 170 can be, for example, the Internet, a metropolitan area network (MAN), a wide area network (WAN), a LAN, or any other type of network or combination of networks. The client device 180 may be, for example, a conventional personal computer (PC), server-class computer, workstation, handheld computing/communication device (e.g., a smartphone), or the like. A user of the client device 180 interacts with the social networking system 100 via an application (e.g. a web browser application) that runs on the client device 180. Via the application, the user of the client device 180 can perform various tasks on the social networking system 100 including browsing content, posting comments, submitting messages, performing queries for people or content objects, and the like.

The social networking system 100 can further include components to exchange information with the third party website 190, such as the application programming interface (API) component 150. The third party website 190 can interact with the social networking system 100 via an API component 150 which is provided by the social networking system 100. For instance, the third party website 190 can perform operations supported by the API, including performing queries to obtain information stored in the social networking system 100, and providing results based on requests from the social networking system 100.

As shown in FIG. 1, the social networking system 100 includes a number of components to store information of objects represented in the social networking system 100, as well as the relationships between the objects. The social networking system 100 further includes components to enable clients interactively using the social networking system 100.

The social networking system 100 includes an object store 100 that stores information of various objects tracked by the social networking system 100. The tracking is subject to the user's privacy settings. These objects can present a variety of things with which a user may interact in the social networking system 100. The objects may include profiles of the users 111, applications 112, events 113, groups 114 to which users may belong, pages 115, content objects 116 such as pictures, videos, audios, texts or any other type of media content, locations 117 associated with users or other objects, and concepts 118.

In one embodiment, the object store 110 can further store content objects representing data produced by users of the social networking system 100, such as inbox messages, status updates, photos, videos, comments, notes and postings. An object in the object store 110 can represent an entity existing with the social networking system 100 (e.g. an application 112 running on the social networking system), a virtual entity that exists outside the domain of the social networking system (e.g. a website), or a real-world entity (e.g. a retail store or a sports team).

The object store 100 can store all objects within the social networking system 100. Alternatively, for virtual entities outside of the social networking system 100, the object store 110 can include pointers or references to the virtual entities, such as the uniform resource locator (URL) of a media file or a webpage stored in a third party website. In addition, the object store 110 can also store metadata associated with the objects, such as names describing the objects, images representing the objects (e.g. user profile pictures), or one or more keyword phrases (e.g. implemented as tags) associated with the objects. A keyword phrase can contain one or more words. Different types of objects can have different types of metadata. For example, a user object 111 can have unique ID, a name, and keyword phrases describing characteristics of the user object 111. A content object 116 can have a media type metadata, a thumbnail image, and keyword phrases describing the content of the content object 116. An object in the object store 100 can contain information as a pointer or a reference to another object. For example, a user object can contain a pointer to a location object to indicate that the user's current location.

In one embodiment, the social networking system 100 further includes a graph information store 120 that stores information for a social graph of the social networking system 100. The social graph contains nodes representing the objects stored in the object store 110. The social graph further contains edges connecting the nodes to represent the relationships between the objects. The graph information store 120 thus includes information of the relationships between the objects, represented as the edges connecting the nodes.

The social graph can include different types of edges representing different relationships between objects. Various examples of edges in the social graph include: an edge between two user objects representing that the users have a relationship in the social networking system (e.g., are friends, or have communicated, viewed the other's profile, or interacted in some way); an edge between a user object and an application object representing that the user has used the application; an edge between a user object and a group object representing that the user belongs to the group; and an edge between a user object and a page object representing that the user has viewed the page, to name just a few.

In one embodiment, if one user establishes a relationship with another user in the social networking system, the two users are each represented as a node, and the edge between them represents the established relationship. The two users are then connected in the social network system. Continuing this example, one of these users may send a message to the other user within the social networking system. This act of sending the message is another edge between those two nodes, which can be stored and/or tracked by the social networking system. The tracking is subject to the user's privacy settings. In one embodiment, the message itself can be treated as a node (i.e. an object in the social networking system).

In another embodiment, one user may post a comment on an image that is maintained or monitored by the social networking system. This commenting interaction can create edges among the nodes representing the user, the image and the posted comment. In yet another embodiment, if a user confirms attending an event, wherein the user and the event are nodes, an edge between these two nodes represents the indication of whether or not the user will attend the event. Using a social graph, therefore, a social networking system may keep track of many different types of objects and edges (the interactions and connections among those objects), thereby maintaining an extremely rich store of socially relevant information. The monitoring and tracking are subject to the user's privacy settings.

In one embodiment, edges in the graph information store 120 can also have associated metadata, such as a label describing the type of relationship (e.g., "friend" as the label between two user objects), or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In one embodiment, the social networking system 100 adds or updates information to the graph information store 120 in real time as it observes events taking place indicating relationships between the various objects, such as a user 111 interacting with an application 112. Additionally, the graph information store 120 can contain edges that are based on existing stored information from which relationships can be inferred. For example, data for a group 114 may indicate that some set of users has a membership relationship with that group, and this information can be reflected in the graph information store 120.

Figure 2:
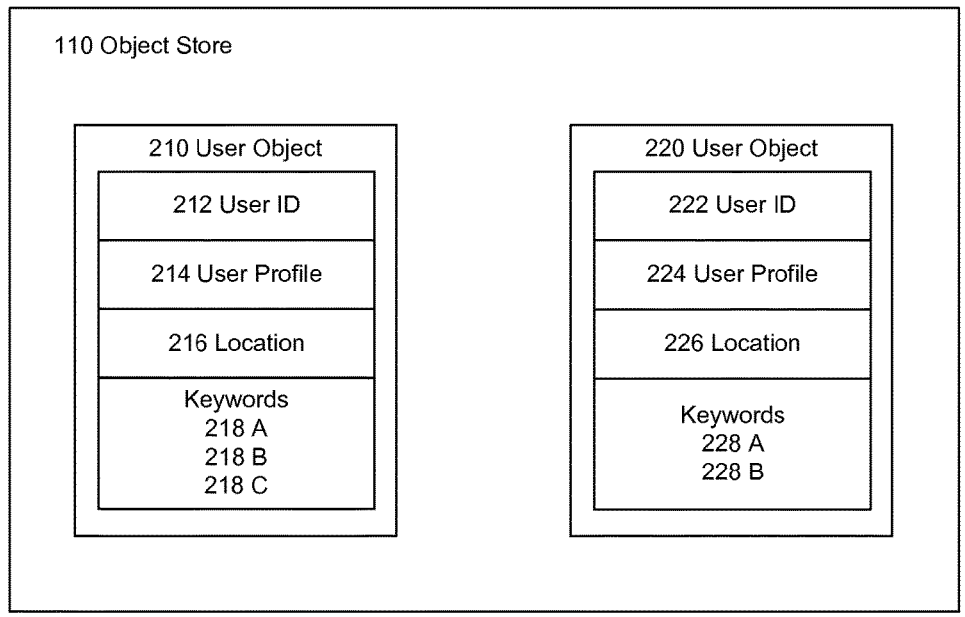
FIG. 2 illustrates an example of an object store for the social networking system.

In one embodiment, the object store 110 of the social network system 100 stores information on the objects including the keyword phrases associated with the objects. FIG. 2 illustrates an example of an object store for the social networking system. The object store 110 includes a user object 210 representing a user of the social networking system and another user object 220 representing another user. The user object 210 can include metadata such as a user ID 212, a user profile 214, a location 216 and keyword phrases (218A, 218B and 218C) associated with the user object 210. Similarly, the user object 220 can include metadata such as a user ID 222, a user profile 224, a location 226 and keyword phrases (228A and 228B) associated with the user object 220. As shown in FIG. 1, the object store 110 can include other objects besides the user objects 210 and 220.

Figure 3:
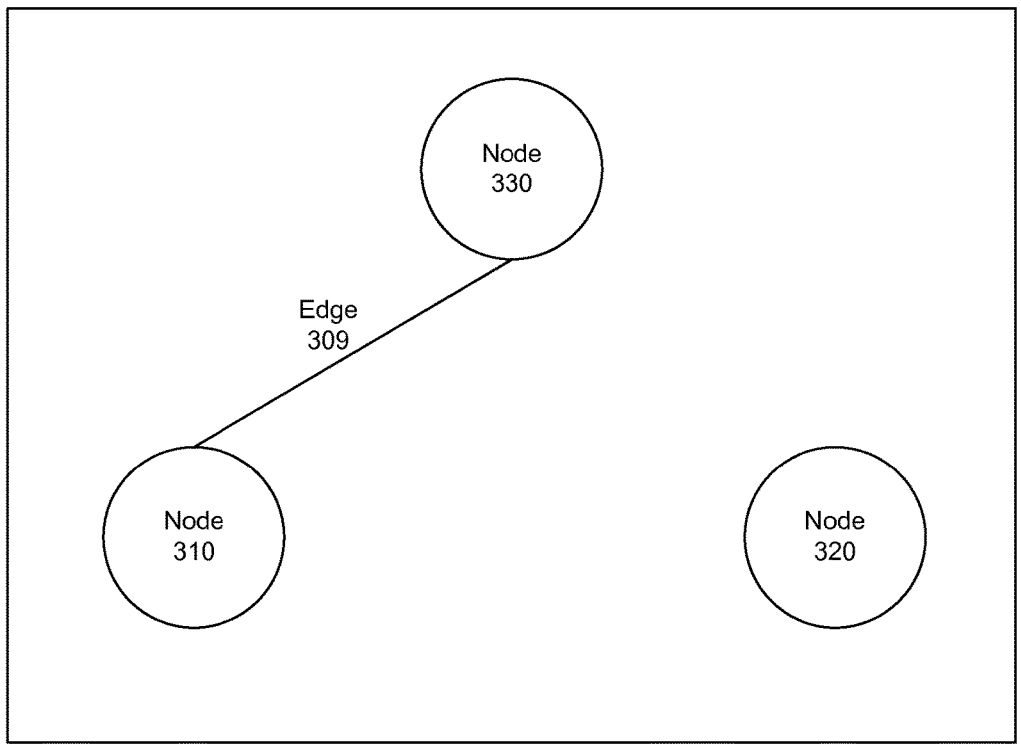
FIG. 3 shows an example of a social graph stored in a graph information store.

A user object can interact with other objects within the social network system 100, including other user objects and content objects. The social network system 100 identifies the interaction and adds edges into the social graph stored in the graph information store 120 (shown in FIG. 1) to represent the relationship between the user object and the object with which the user object interacts. For example, FIG. 3 shows an example of a social graph stored in a graph information store. Node 310 is a node in the social graph that represents the user object 210 of FIG. 2. Node 320 is a node in the social graph that represents the user object 220 of FIG. 2. Node 330 is a node in the social graph that represents a content object. In some embodiments, the node 330 can represents a content object such as an image, a video, an audio, a text, a post, a webpage, or a URL.

A user represented by the node 310 (also referred to as "user 310") interacts with the content object represented by the node 330 (also referred to as "content object 330"). For example, the user 310 may click to view a webpage 330. Or the user 310 may comment on an image 330. Or the user 310 may click a Like button of a video 330 to indicate that the user 310 likes the video 330. The social networking system detects the interaction between the user 310 and the content object 330. Accordingly, the graph information store 120 adds an edge 309 between the node 310 and node 330 to represent the interaction relationship between the nodes.

Figure 4:
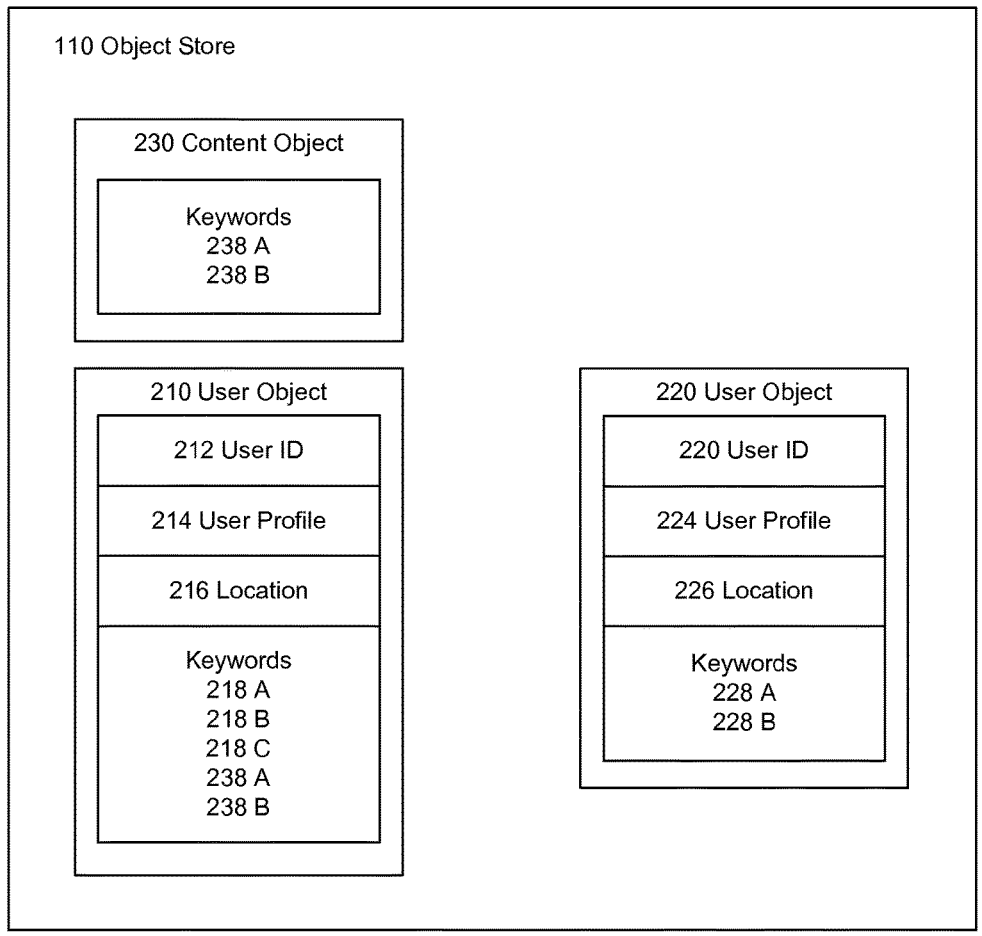
FIG. 4 illustrates an example of an object store for the social networking system after a user interacting with a content object.

In one embodiment, the social networking system looks for an object in the object store 110 that is represented by the node 330. FIG. 4 illustrates an example of the object store that includes the content object 230 that is represented by the node 330 of FIG. 2. The content object 230 includes a number of keyword phrases 238A and 238B. In one embodiment, the content object 230 is a webpage; and the keyword phrases 238A and 238B are the keyword phrases associated with the webpage.

In another embodiment, the social networking system looks for an object in the object store 110 that is represented by the node 330 and finds no such object. The social networking system creates an object 230 to be represented by the node 330.

Then the social networking system conducts a reverse keyword search on the content object. For example, the content object is a webpage; and the social networking system conducts reverse keyword search based on a URL of the webpage. If there is any keyword phrase returned from the reverse keyword search, the social networking system includes the returned keyword phrase into the object 330 of the object store 110. In yet another embodiment, the social networking system finds existing keyword phrases associated with the object 330. And the social networking system still conducts a reverse keyword search for an update of the keyword phrases. If there is any difference between the keyword phrases returned and the existing keyword phrases, the social networking system updates the object 330 to reflect the latest search result of the reverse keyword search.

Once the social networking system identifies the content object 330 and its associated keyword phrases 238A and 238B, the social networking system associates the keyword phrases 238A and 238B to the user object 210 based on the interaction represented by the edge 309 of FIG. 3. After the associating, the user object 210 includes keyword phrases 218A, 218B, 218C, as well as 238A and 238B, as shown in FIG. 4.

The social networking system compares the keyword phrases included in the user object 210 with keyword phrases included in another user object, such as user object 220. In one embodiment, the social networking system identifies a match between the keyword phrase 238B in the user object 210 with the keyword phrase 228B in the user object 220. Based on the match between the keyword phrases 238B and 228B, the social networking system determines a mutual interest that is suggested by the keyword phrases 238B and 228B for the users identified by the user objects 210 and 220.

In one embodiment, the social networking system can identify multiple matches between keyword phrases associated with two users of the social networking system. The match is not necessarily a one-to-one keyword phrase match. There can be a match between one keyword phrase associated with one user and multiple keyword phrases associated with another user. Or there can be a match between multiple keyword phrases associated with one user and multiple keyword phrases associated with another user. In another embodiment, there can be multiple matches between keyword phrases associated with one user and keyword phrases associated with another user. The social networking system determines multiple mutual interests based on the keyword phrase matches.

In one embodiment, the social networking system identifies a match when a keyword phrase associated with one user is identical to a keyword phrase associated with another user. In another embodiment, the social networking system identifies a match when a keyword phrase associated with one user is closely related to a keyword phrase associated with another user. In yet another embodiment, the social networking system identifies a match when a keyword phrase associated with one user is a synonym or an antonym of a keyword phrase associated with another user.

Figure 5:
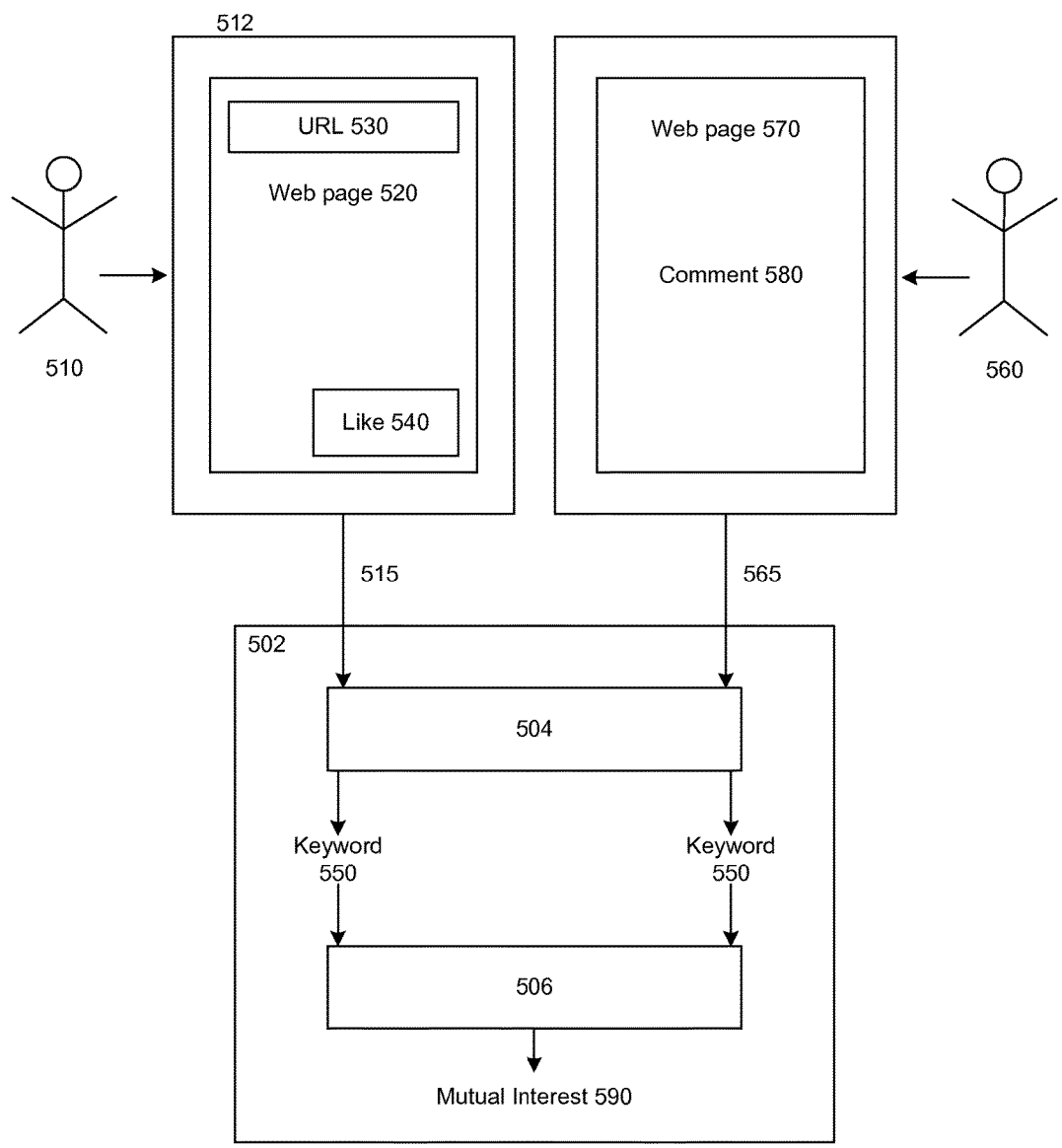
FIG. 5 illustrates an example scenario of identifying a mutual interest between two users of the social networking system.

The social networking system monitors and analyzes the user activities to collect keyword phrases that represent interests of the users. The system compares the keyword phrases to identify mutual interests between the users. FIG. 5 illustrates a scenario of identifying a mutual interest between two users of a social networking system. A user 510 of a social networking system reads a webpage 520 identified by a URL 530 of the webpage 520. The webpage 520 can be rendered by a browser program running a computer or a smart phone 512. The user 510 clicks a Like button 540 placed in the webpage 520 to indicate that the user 510 likes the content of the webpage 520. Accordingly, the browser sends a message 515 about the user 510's action to the social networking system 502. In one embodiment, the message 515 can include URL 530 as an identification of the webpage 520. In some embodiments, the social networking system 502 can include a user activity track module 508 (not shown) dedicated to monitor and detect users' interaction with content objects. The monitoring and tracking are subject to the user's privacy settings.

In another embodiment, a user of a social networking system interacts with a content object rendered in an application running on a user device (e.g. a mobile device or a computer). The user device monitors the user activities related to the application. Once a user activity indicating that the user is interested in the content object is recognized, the user device sends a message about the user's action to the social networking system, in a similar manner as described in the previous paragraph. For instance, the user activity can be that the user has been clicking the content object for more than a predetermined time period.

The social networking system 502 conducts a reverse keyword search on the webpage 520. In one embodiment, the reverse keyword search is conducted by a reverse keyword search engine 504 inside the social networking system 502. In another embodiment, the reverse keyword search was conducted on a third party server or cluster as a third party service.

The social networking system can receive one or more keyword phrases associated with the webpage 520 as a result of the reverse keywords search. In the context of the description herein, a keyword phrase can include one or more words, a phrase, or a sentence; and can even include symbols. For example, the social networking system identifies a keyword phrase 550 "colonization of mars" from the reverse keyword search on the webpage 520. Based on the interaction between the user 510 and the webpage 520, the social networking system associates the keyword phrase 550 "colonization of mars" to the user 510 to suggest that the user 510 is interested in the topic of "colonization of mars."

Similarly, using a browser program, another user 560 of the social networking system posts a comment 580 on the social networking system citing a webpage 570. Accordingly, the browser program sends a message 565 about the user 560's action to the social networking system. In one embodiment, the message 565 can also include a URL of the webpage 570 as identification of the content object. The social networking system conducts another reverse keyword search on the webpage 570. The social networking system identifies the same keyword phrase 550 "colonization of mars," as a result of the reverse keyword search. Based on the interaction between the user 560 and the webpage 570, the social networking system associates the same keyword phrase 550 "colonization of mars" to the user 560 to suggest that the user 560 is also interested in the topic of "colonization of mars."

The social networking system 502 compares the keyword phrases associated with the user 510 with the keyword phrases associated with the user 560. In one embodiment, the social networking system 502 includes a user match module 506 to identify a keyword phrase match that both the users 510 and 560 are associated with the keyword phrase 550. Suggested by the shared keyword phrase 550, the user match module 506 determines a mutual interest 590 for "colonization of mars" for both users 510 and 560 of the social networking system 502.

In one embodiment, the social networking system can have a feature to introduce or recommend users who share one or more interests (e.g. a "People You Should Meet" feature). For example, the social networking system can send a private system message to a user indicating that another user shares a common interest with him/her. Or, the social networking system identifies that users A and B share a common interest, and sends a notice to user A suggesting that user A attend an event because user B also plans to attend the event.

Figure 6:
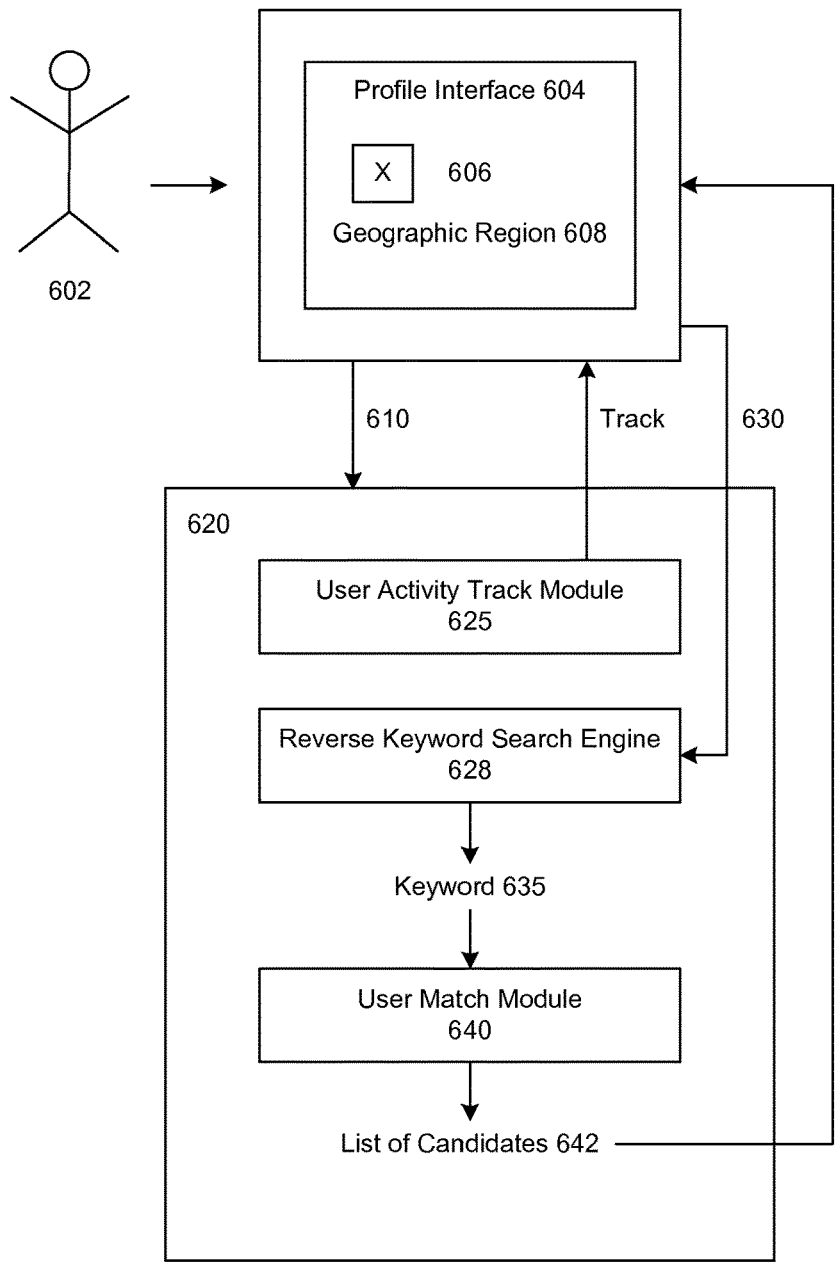
FIG. 6 illustrates an example of an automatic matchmaking functionality of the social networking system.

The social networking system can conduct the matchmaking functionality without users' intervention. FIG. 6 illustrates an example of the automatic matchmaking functionality of the social networking system. A user 602 of the social networking system 620 can set up the user profile of the user 602 to instruct the social networking system 620 that the user 602 wants to opt-in to the automatic matchmaking functionality. For example, the user 602 can click an opt-in checkbox 606 in a user profile interface webpage 604 for the automatic matchmaking functionality. The user 602 can further identify the geographic region 608 in the user profile on which the matchmaking functionality should focus. In another embodiment, the social networking system 620 can automatically identify the geographic region based on the user profile and user activity history without intervention from the user 602. The choice that the user 602 made is sent to the social networking system 620 as an instruction 610.

Upon receiving the instruction 610, the social networking system 620 starts to track the user activities of the user 602 including the user's interactions with content objects such as pictures, videos, audios, texts or any other type of media content. There are various user interactions being tracked by the social networking system. For example, the user can click and read a webpage, post a comment to a posted message, or click a Like button to express the appreciation of an online article. In one embodiment, the social networking system 620 includes a user activity track module 625 dedicated to monitoring and detecting the users' interaction with content objects. The monitoring and tracking are subject to the user's privacy settings.

Each time the social networking system 620 detects a content object with which the user has interactions, the social networking system conducts a reverse keyword search in its reverse keyword search engine 628 based on the interacted content object 630. The social networking system may receive one or more keyword phrases 635 associated with the content object 630. If the social networking system receives any keyword phrase 635, the system associates the keyword phrase with the user 602.

Periodically, the social networking system 620 uses a user match module 640 to search candidates who have keyword phrases matched with the keyword phrases associated with user 602, among users located in the target geographic region. The search result varies over time since keyword phrases associated with users constantly evolve and increase. In one embodiment, the social networking system provides the user 602 with a list of candidates 642. The list of candidates 642 is accompanied by the matched keyword phrases and certain profile information of the candidates. The social networking system can further provide links to communicate with the candidates. For example, the user 602 may click one entry of the list of candidates to access a user interface to provide and send a system message to a candidate. In some embodiments, the system initially conceals the identities of the candidates from the user 602 to protect user privacy. The system may later reveal the identity of a candidate once the candidate confirms the reveal request or the candidate starts to interact with the user 602. During the automatic matching process, the user 602 does not need to specify any characteristics of potential matching candidates.

The social networking system automatically tracks and analyzes the user 602's activities to assess the interests of the user 602. The tracking is subject to the user's privacy settings. Based on the information from the automatic tracking, the social networking system is able to present matching candidates to the user 602 periodically. In one embodiment, the user 602 can choose the frequency for receiving matching candidate suggestions. In another embodiment, the social networking system automatically determines the frequency based on the user activities of the user 602 and how often the keyword phrases associated with the user 602 are updated.

Figure 7:
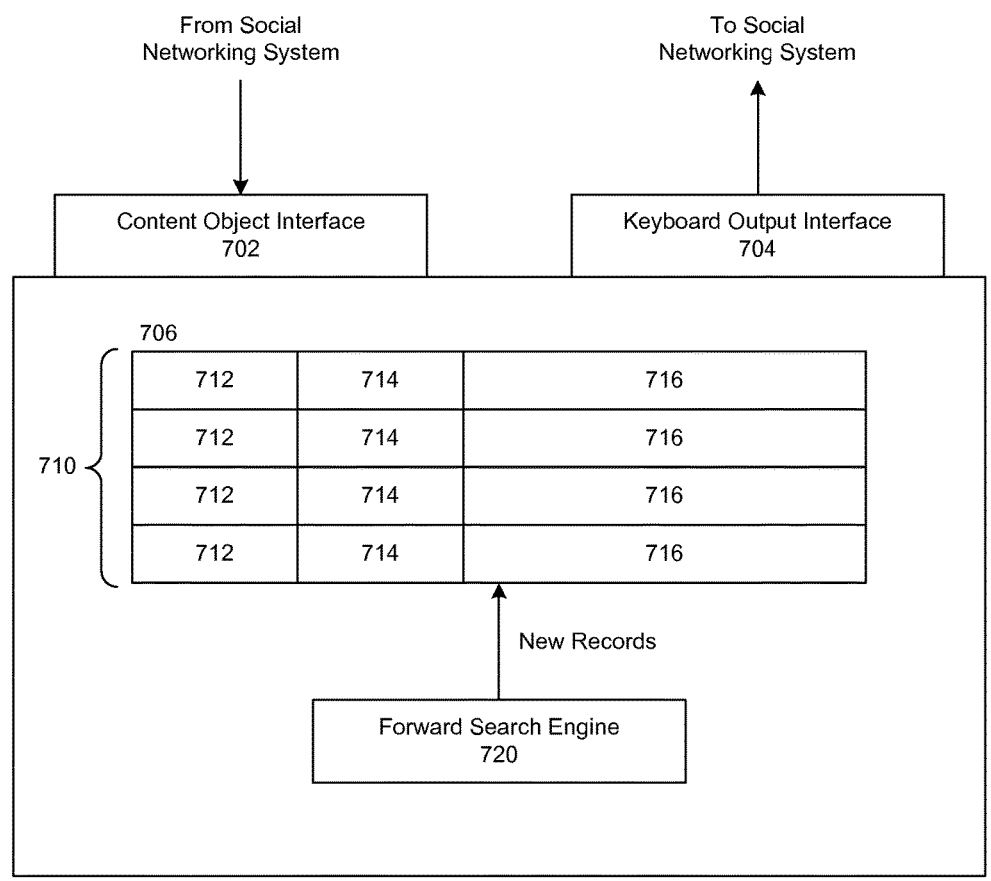
FIG. 7 illustrates a sample reverse keyword search engine for the social networking system.

The social networking system can include a reverse keyword search engine to generate keyword phrases based on the inputs of content objects. FIG. 7 illustrates a sample reverse keyword search engine. In one embodiment, the reverse keyword search engine is part of the social networking system. In another embodiment, the reverse keyword search engine works as a third party server outside of the social networking system. As shown in FIG. 7, the reverse keyword search engine 700 includes a content object interface 702. The content object interface is configured to receive content objects or the identifications (e.g. URLs) of the content objects from the social networking system. The reverse keyword search engine 700 further includes a keyword output interface 704. Once the reverse keyword search engine 700 generates the keyword phrases associated with the received content object, the keyword output interface 704 sends the associated keyword phrases to the social networking system.

The reverse keyword search engine 700 also includes a search pattern database 706 to record the relationships between the content objects and the keyword phrases. As shown in FIG. 7, the search pattern database 706 contains a plurality of records 710. Each record 710 includes an identifier 712 of a content object and a keyword phrase 714 associated with the content object. There can be multiple records having the same identifier 712 and different keyword phrases 714. Similarly, there can be multiple records having the same keyword phrases 714 and different identifier 712. The record 710 can further include metadata 716. In one embodiment, the metadata can include a rank of the content object in a forward search result using the keyword phrase. A forward search is a conventional web search process that takes keyword phrases as input and outputs a list of related web pages or contents.

The reverse keyword search engine 700 generates the records 710 by conducting multiple forward searches using a forward search engine 720. In one embodiment, for each forward search using a keyword phrase, the first N number of search results (i.e. content objects) are considered to be associated with the keyword phrase, N being a predetermined number. Accordingly the first N number of content objects are recorded along with the associated keyword phrase in the search pattern database 706. In one embodiment, the forward search engine 720 is built-in as part of the reverse keyword search engine 700, as illustrated in FIG. 7. In another embodiment, the forward search engine 720 can be a separate server outside of the reverse keyword search engine 700.

Figure 8:
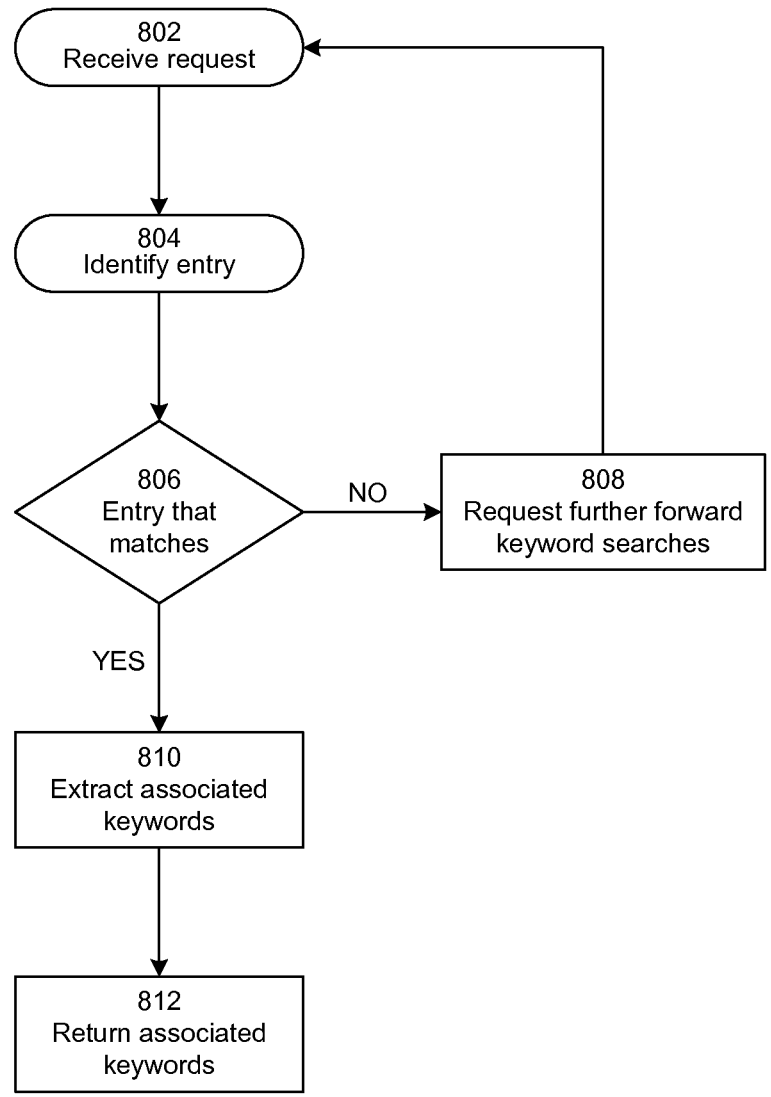
FIG. 8 illustrates steps of a sample reverse keyword search process.

FIG. 8 illustrates a sample reverse keyword search process. For instance, the reverse keyword search engine 700 as shown in FIG. 7 can conduct the sample reverse keyword search process as illustrated in FIG. 8. At step 802, a reverse keyword search engine receives a request to conduct a reverse keyword search on a content object. The request can include an identifier of the content object or the content object itself. For instance, the content object can be a webpage and the identifier can be a URL of the webpage. At step 804, the reverse keyword search engine identifies entries in its search pattern database to check whether there are any entries that matches the content object (806). The reverse keyword search engine collects the entries in the search pattern database by conducting continuous or periodic forward keyword searches. If there is no entry in the search pattern database that matches the content object, the reverse keyword search engine may request further forward keyword searches (808). If there is an entry identified as matching the content object, at step 810, the reverse keyword search engine extracts the associated keyword phrases from the identified entries from the search pattern database. At step 812, the reverse keyword search engine returns the associated keyword phrases as the result of the reverse keyword search request.

Figure 9:
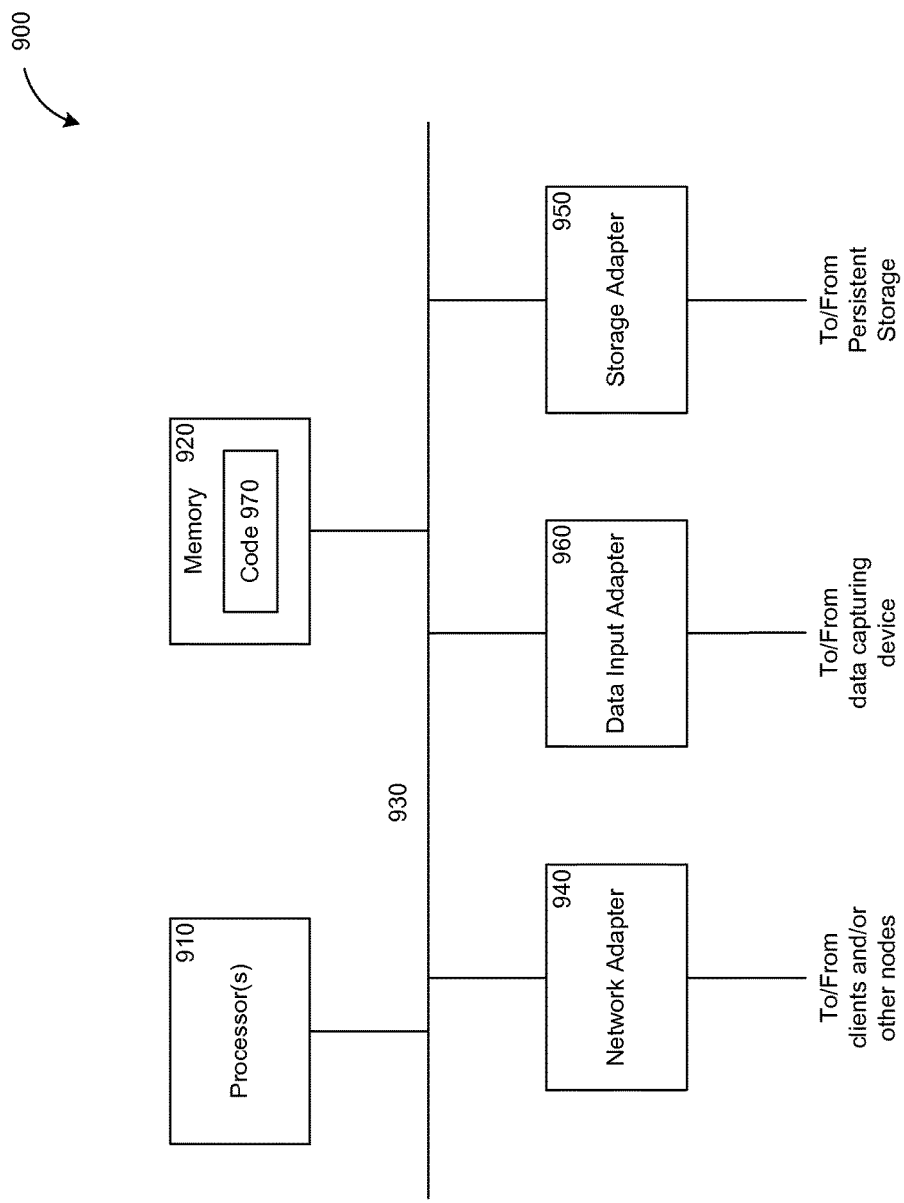
FIG. 9 is a high-level block diagram showing an example of the architecture of a computer of the social networking system.

FIG. 9 is a high-level block diagram showing an example of the architecture of a computer of the social networking system, which may represent any server or host computer hosting the user activity track module, the reverse keyword search engine, the object store, the graph information store, the user match module, the search pattern database, the forward search engine, or other components of the social networking system described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the storage controller 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain a code 970. In one embodiment, the code 970 includes a user activity track module, a reverse keyword search engine, a user match module, or a forward search engine described herein.

Also connected to the processor(s) 910 through the interconnect 930 are a network adapter 940 and a storage adapter 950. The network adapter 940 provides the computer 900 with the ability to communicate with remote devices, over a network and may be, for example, an Ethernet adapter or Fibre Channel adapter. The network adapter 940 may also provide the computer 900 with the ability to communicate with other computers within the social networking system. In some embodiments, a computer may use more than one network adapter to deal with the communications within and outside of the system separately. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), or field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A method, comprising:
identifying, by a social networking system, a first content object with which a first user of the social networking system has interacted at a previous time period;
conducting a reverse keyword search on the first content object to identify a first keyword phrase associated with the first content object by:
performing a plurality of forward keyword searches until the first content object is identified in search results of a forward keyword search of the plurality of forward keyword searches; and
generating the first keyword phrase for the first content object utilizing a keyword phrase of the forward keyword search that identified the search results having the first content object;
associating, by the social networking system, the first keyword phrase with the first user;
identifying a match between the first keyword phrase associated with the first user and a second keyword phrase associated with a second user of the social networking system; and
determining, by the social networking system and based on the match, a common interest for the first user and the second user that is represented by the first keyword phrase and the second keyword phrase.

2. The method of claim 1, wherein:
the first content object is a webpage having a URL; and
performing the plurality of forward keyword searches comprises performing forward keyword searches until the URL appears in the search results of the forward keyword search.

3. The method of claim 1, further comprising:
determining that the first content object is absent from a reverse search database that records relationships between content objects and keyword phrases; and
subsequently adding, based on the reverse keyword search, the first keyword phrase to the reverse search database in connection with the first content object.

4. The method of claim 3, further comprising:
identifying a first identifier of the first content object; and
wherein determining that the first content object is absent from the reverse search database comprises determining that the first identifier is not indexed in the reverse search database.

5. The method of claim 1, wherein the social networking system identifies that the first user interacts with the first content object outside of the social networking system at the previous time period.

6. The method of claim 1, further comprising:
identifying, by the social networking system, a second content object with which the second user of the social networking system has interacted;
conducting a second reverse keyword search on the second content object; and
associating, by the social networking system, the second keyword phrase with the second user.

7. The method of claim 1, further comprising identifying the second keyword phrase associated with the second user from a social networking profile of the second user.

8. The method of claim 1, further comprising:
determining that the first content object is absent from a reverse search database that records relationships between content objects and keyword phrases; and
updating the reverse search database to add an entry for the first content object that associates the first content object with the first keyword phrase from the forward keyword search.

9. A non-transitory computer-readable medium storing instructions that, when executed by at least one processor, cause a computer system to:
identify a first content object with which a first user of a social networking system has interacted at a previous time period;
conduct a reverse keyword search on the first content object to identify a first keyword phrase associated with the first content object by:
performing a plurality of forward keyword searches until the first content object is identified in search results of a forward keyword search of the plurality of forward keyword searches; and
generating the first keyword phrase for the first content object utilizing a keyword phrase of the forward keyword search that identified the search results having the first content object;
associate the first keyword phrase with the first user;
identify a match between the first keyword phrase associated with the first user and a second keyword phrase associated with a second user of the social networking system; and
determine, based on the match, a common interest for the first user and the second user that is represented by the first keyword phrase and the second keyword phrase.

10. The non-transitory computer-readable medium of claim 9, further comprising instructions that, when executed by the at least one processor, cause the computer system to:
determine that the first content object is absent from a reverse search database that records relationships between content objects and keyword phrases; and
update the reverse search database to add a first database entry for the first content object that associates the first content object with the first keyword phrase from the forward keyword search.

11. The non-transitory computer-readable medium of claim 10, further comprising instructions that, when executed by the at least one processor, cause the computer system to conduct the reverse keyword search on a second content object associated with the second user by identifying a second database entry from the reverse search database, wherein the second database entry records a relationship between the second content object and the second keyword phrase.

12. The non-transitory computer-readable medium of claim 10, further comprising instructions that, when executed by the at least one processor, cause the computer system to update a plurality of database entries within the reverse search database with updated keyword phrases by periodically preforming forward keyword searches to identify new associations to content objects.

13. The non-transitory computer-readable medium of claim 10, wherein generating the first keyword phrase for the first content object is based on not identifying an entry in the reverse search database for an identifier associated with the first content object.

14. The non-transitory computer-readable medium of claim 9, further comprising instructions that, when executed by the at least one processor, cause the computer system to provide, within a graphical user interface on a client device associated with the first user, an invitation to associate with the second user.

15. The non-transitory computer-readable medium of claim 9, further comprising instructions that, when executed by the at least one processor, cause the computer system to:
determine that the second user is planning to attend an event associated with the common interest; and
provide, based on the determination, an invitation to the first user to attend the event.

16. A system comprising:
at least one processor; and
at least one non-transitory computer-readable storage medium storing instructions that, when executed by the at least one processor, cause the system to:
identify a first content object with which a first user of a social networking system has interacted at a previous time period;
conduct a reverse keyword search on the first content object to identify a first keyword phrase associated with the first content object by:
performing a plurality of forward keyword searches until the first content object is identified in search results of a forward keyword search of the plurality of forward keyword searches; and
generating the first keyword phrase for the first content object utilizing a keyword phrase of the forward keyword search that identified the search results having the first content object;
associate the first keyword phrase with the first user;
identify a match between the first keyword phrase associated with the first user and a second keyword phrase associated with a second user of the social networking system; and
determine, based on the match, a common interest for the first user and the second user that is represented by the first keyword phrase and the second keyword phrase.

17. The system of claim 16, further comprising instructions that, when executed by the at least one processor, cause the system to:
identify a first entry for the first content object within a reverse search database by utilizing the first content object as input; and
perform an additional forward keyword search to determine an additional keyword phrase for the first content object; and
update the first entry within the reverse search database to associate the additional keyword phrase with the first content object.

18. The system of claim 16, further comprising instructions that, when executed by the at least one processor, cause the system to identify the match between the first user and the second user based on multiple keyword phrases associated with the first user matching multiple keyword phrases associated with the second user.

19. The system of claim 16, further comprising instructions that, when executed by the at least one processor, cause the system to:
  determine that the first content object is absent from a reverse search database that records relationships between content objects and keyword phrases; and
  update the reverse search database to add a first database entry for the first content object that associates the first content object with the first keyword phrase from the forward keyword search.

20. The system of claim 19, further comprising instructions that, when executed by the at least one processor, cause the system to conduct the reverse keyword search on a second content object associated with the second user by identifying the second keyword phrase within the reverse search database based on the second content object being used as input to the reverse search database.

* * * * *